US010225158B1

(12) United States Patent
Lu et al.

(10) Patent No.: US 10,225,158 B1
(45) Date of Patent: Mar. 5, 2019

(54) POLICY BASED SYSTEM MANAGEMENT

(71) Applicant: EMC IP Holding Company LLC, Hopkinton, MA (US)

(72) Inventors: Binhua Lu, Shanghai (CN); Xiaogang Wang, Shanghai (CN); Dazhi Dong, Shanghai (CN); Xing Chen, Shanghai (CN); Norman Speciner, Medway, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 423 days.

(21) Appl. No.: 14/579,288

(22) Filed: Dec. 22, 2014

(51) Int. Cl.
| | |
|---|---|
| *G06F 17/30* | (2006.01) |
| *H04L 12/24* | (2006.01) |
| *G06F 3/0482* | (2013.01) |
| *H04L 29/08* | (2006.01) |
| *G06F 16/11* | (2019.01) |
| *G06F 16/185* | (2019.01) |

(52) U.S. Cl.
CPC ............ *H04L 41/22* (2013.01); *G06F 3/0482* (2013.01); *G06F 16/113* (2019.01); *G06F 16/185* (2019.01); *G06F 17/30073* (2013.01); *G06F 17/30221* (2013.01); *H04L 67/10* (2013.01)

(58) Field of Classification Search
CPC ......... G06F 17/30221; G06F 17/30073; H04L 41/22
See application file for complete search history.

(56) References Cited

U.S. PATENT DOCUMENTS

| | | | | |
|---|---|---|---|---|
| 5,802,146 | A * | 9/1998 | Dulman ............... | H04M 3/2254 379/120 |
| 5,860,083 | A * | 1/1999 | Sukegawa ............... | G06F 12/08 711/103 |
| 6,044,347 | A * | 3/2000 | Abella ..................... | G10L 15/18 704/272 |
| 6,714,977 | B1 * | 3/2004 | Fowler .................. | H04L 69/329 700/83 |
| 6,868,543 | B1 * | 3/2005 | Nusbickel ............... | G06F 9/542 719/310 |
| 7,103,740 | B1 * | 9/2006 | Colgrove .............. | G06F 3/0605 707/999.202 |
| 7,162,599 | B2 * | 1/2007 | Berkowitz .......... | G06F 11/1451 707/999.202 |
| 7,720,818 | B1 * | 5/2010 | Laura ..................... | G06Q 40/02 707/609 |

(Continued)

OTHER PUBLICATIONS

Cisco Systems, "Understanding SNMP Traps", Oct. 10, 2006, Cisco Systems.*

(Continued)

*Primary Examiner* — Rehana Perveen
*Assistant Examiner* — Huen Wong
(74) *Attorney, Agent, or Firm* — Muirhead and Saturnelli, LLC

(57) ABSTRACT

Described are techniques for performing system management. A first policy definition of a first policy is received. The first policy definition includes information identifying a first criterion, a first resource of the system, and a first action to be taken. It is determined whether a condition of the first policy is met. The condition includes the first criterion. Responsive to determining that the condition is met, first processing is performed that includes performing the first action.

20 Claims, 11 Drawing Sheets

(56) References Cited

U.S. PATENT DOCUMENTS

| | | | |
|---|---|---|---|
| 8,635,247 B1* | 1/2014 | Klinkner | H04L 47/70 707/783 |
| 2002/0059472 A1* | 5/2002 | Wollrath | G06F 9/542 719/318 |
| 2002/0124081 A1* | 9/2002 | Primm | H04L 29/06 709/224 |
| 2003/0037010 A1* | 2/2003 | Schmelzer | G06F 17/30026 705/67 |
| 2003/0037040 A1* | 2/2003 | Beadles | H04L 41/0893 |
| 2003/0221051 A1* | 11/2003 | Hand | H04L 29/06 711/106 |
| 2007/0074171 A1* | 3/2007 | Burka | G06F 9/45516 717/127 |
| 2007/0078815 A1* | 4/2007 | Weng | G06F 17/30401 |
| 2007/0185934 A1* | 8/2007 | Cannon | G06F 11/1451 |
| 2007/0260417 A1* | 11/2007 | Starmer | G01K 7/425 702/136 |
| 2007/0261097 A1* | 11/2007 | Siegman | G06F 3/023 725/134 |
| 2008/0201459 A1* | 8/2008 | Vul | H04L 29/06 709/223 |
| 2008/0209264 A1* | 8/2008 | Morse | G06F 11/0778 714/6.32 |
| 2008/0294705 A1* | 11/2008 | Brauckhoff | G06F 12/08 |
| 2011/0320508 A1* | 12/2011 | Naito | G06F 17/3012 707/827 |
| 2012/0068844 A1* | 3/2012 | Day | H04L 41/0627 340/540 |
| 2012/0116590 A1* | 5/2012 | Florez-Larrahondo | G06F 1/206 700/275 |
| 2012/0198253 A1* | 8/2012 | Kato | G06F 1/20 713/320 |
| 2012/0271941 A1* | 10/2012 | Mirandette | H04L 67/22 709/224 |
| 2013/0117766 A1* | 5/2013 | Bax | G06F 9/4405 719/323 |
| 2014/0181294 A1* | 6/2014 | Deshpande | G06F 9/45533 709/224 |
| 2015/0081644 A1* | 3/2015 | Pitts | G06F 11/1458 707/676 |

OTHER PUBLICATIONS

Case et al., RFC 1157 "A Simple Network Management Protocol (SNMP)", May 1990, The Internet Engineering Task Force.*

Microsoft Corporation, "What is SNMP?", Mar. 28, 2003, Microsoft Corporation.*

Sun Microsystems, "The Java Tutorial", 2008, Sun Microsystems—(retrieved @ http://infodoc.iut.univ-aix.fr/~ihm/docs/tutorial/uiswing/events/intro.html).*

* cited by examiner

| Description 420c | ID String 420b | Usage 320 |
|---|---|---|
| IO rate Per Second | IOPS | Global IOPS or IOPS on Tenant's storage resource |
| System available time | SYSTEM_AVAIL_TIME | Global or Tenant's storage resource in service time |
| Login Failure | LOGIN_FAILURE | Threshold: Continuous 30 login failures in 1 min for the same account. |
| Enclosure Temperature | ENCLOSURE_TEMPERATURE | Real time temperature |
| Power consumption | POWER_CONSUMPTION | Rolling average in last 30 mins. |
| VM Provisioning speed | VM_PROVISIONING_SPEED | Global speed or on tenant's storage resource |

FIG. 4

| Description 460c | ID String 460b | Usage 610 |
|---|---|---|
| Data collection | DATA_COLLECTION_ACTION | Global or on Tenant's storage resource |
| Alert and Health report collection | HEALTH_ALERT_REPORT_ACTION | Global or on Tenant's storage resource |
| UI notification | UI_NOTIFY_ACTION | Global |
| Email notification | EMAIL_NOTIFY_ACTION | Global |
| Pool auto expanding | POOL_AUTO_EXPANDING_ACTION | Global or on Tenant's storage resource |
| LUN auto expanding | LUN_AUTO_EXPANDING_ACTION | Global or on Tenant's storage resource |
| LUN Compression | LUN_COMPRESSION_ACTION | Global or on Tenant's storage resource |
| LUN Deduplication | LUN_DEDUPLICATION_ACTION | Global or on Tenant's storage resource |
| LUN Snapshot | LUN_SNAPSHOT_ACTION | Global or on Tenant's storage resource |
| LUN Replication | LUN_REPLICATION_ACTION | Global or on Tenant's storage resource |
| Anti-attack | BAN_IP_ACTION | Global |
| Data analysis and Email notification | DATA_ANALYSIS_AND_EMAIL | Global or on Tenant's storage resource |

FIG. 7

POLICY BASED SYSTEM MANAGEMENT

BACKGROUND

Technical Field

This application generally relates to system management, more specifically, to techniques for policy based management.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of performing system management comprising: receiving a first policy definition of a first policy, said first policy definition including information identifying a first criterion, a first resource of the system, and a first action to be taken; determining whether a condition of the first policy is met, said condition including the first criterion; and responsive to determining that the condition is met, performing first processing, said first processing including performing the first action. The first criterion may include any of a key performance indicator, a time based criterion and an event based criterion. The method may include receiving a configuration file including first information identifying a first portion of criteria and actions that may be specified in a policy definition; displaying, in accordance with the first portion of criteria and actions, multiple items on a user interface for configuring the first policy; and defining said first policy, wherein said defining includes selecting one or more of the multiple items from the user interface. The one or more items selected may be included in the first policy definition and the one or more items may specify any of the first criterion and the first action. The system may be a data storage system. The first criterion may identify a key performance indicator and the first policy definition may include a threshold where the condition is met when the key performance indicator is above said threshold. The first criterion may identify an event based criterion and the first policy may include a threshold. The condition may be met indicating an event occurrence when the first threshold is exceeded with respect to the first resource. The first criterion may denote a threshold amount of total storage capacity of a storage resource being consumed and the storage resource may be any of a logical device and a storage pool. The first action may include automatically expanding the total storage capacity of the storage resource. The first action may include automatically performing any of sending any of an electronic mail notification to a user of a management application and displaying a notification on a user interface display. The first policy definition may be specified using any of a graphical user interface and a command line interface. The first portion of criteria and actions may identify less than a total set of criteria and actions supported by a management application in connection with defining policies for system management. The first policy definition may be stored in a database including a plurality of tables. The plurality of tables may include a criteria table, an action table, a storage resource table, and a policy table. The policy table may include a row for each policy definition where the row may include a criterion identifier identifying a row in the criteria table denoting a criterion of said each policy definition, a storage resource identifier identifying a row in the storage resource table denoting a resource of said each policy, and an action identifier identifying a row in the action table for an action of said each policy. The first policy definition may have a corresponding row in the policy table. The key performance indicator may be any of an I/O rate per unit of time, an amount of time a storage resource is available, a number of login failures per unit of time, a temperature, an average amount of power consumed, an amount of time to perform an operation, and an amount of time to provision storage for a virtual machine. The first action may include any of perform data collection, perform data analysis, send one or more electronic notifications, automatically expand storage capacity of any of a logical device and storage pool, automatically perform any of compression, deduplication, snapshot, and replication, and automatically disable logins for a user account.

In accordance with another aspect of the invention is a system comprising a processor; and a memory, the memory including code stored therein that, when executed, performs a method comprising: receiving a first policy definition of a first policy, said first policy definition including information identifying a first criterion, a first resource of the system, and a first action to be taken; determining whether a condition of the first policy is met, said condition including the first criterion; and responsive to determining that the condition is met, performing first processing, said first processing including performing the first action.

In accordance with another aspect of the invention is a computer readable medium comprising code stored thereon that, when executed, performs a method of system management comprising: receiving a first policy definition of a first policy, said first policy definition including information identifying a first criterion, a first resource of the system, and a first action to be taken; determining whether a condition of the first policy is met, said condition including the first criterion; and responsive to determining that the condition is met, performing first processing, said first processing including performing the first action. The first criterion may include any of a key performance indicator, a time based criterion and an event based criterion. The method may further include receiving a configuration file including first information identifying a first portion of criteria and actions that may be specified in a policy definition; displaying, in accordance with the first portion of criteria and actions, multiple items on a user interface for configuring the first policy; and defining said first policy, wherein said defining includes selecting one or more of the multiple items from the user interface.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example of key performance indicators (KPIs) that may be included in an embodiment in accordance with techniques herein;

FIG. 7 is an example of actions that may be used in an embodiment in accordance with techniques herein;

DETAILED DESCRIPTION OF EMBODIMENT(S)

Figure 1:
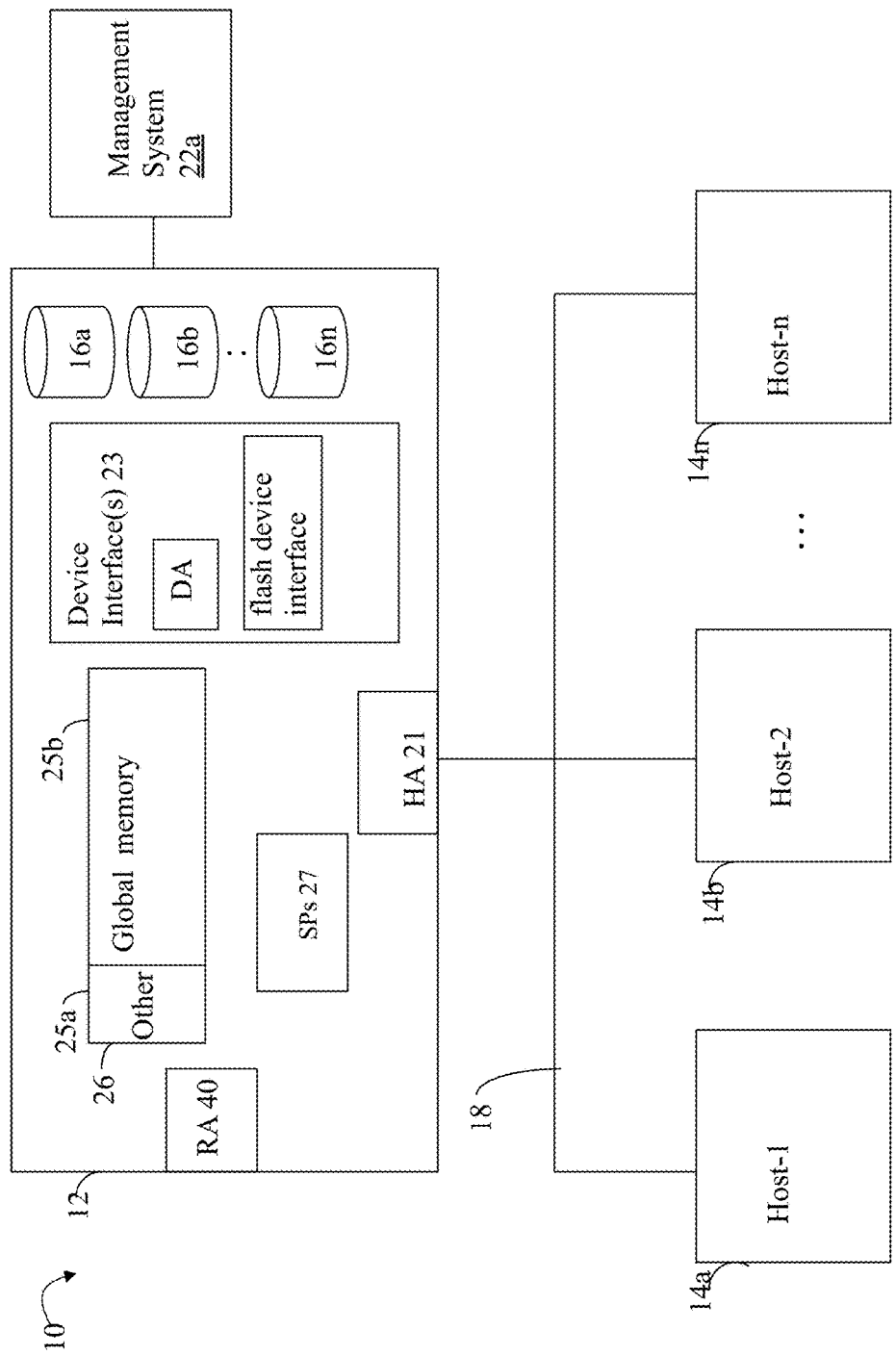
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel (FC), iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular PD may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, RAID groups, and the like, on a user interface (UI) in display device of the management system 22a. A RAID group is known in the art and refers to a group of multiple physical drives having a particular RAID configuration providing data protection. For example, a RAID-1 RAID group provides for mirroring whereby each data item is physically stored on two different physical drives. RAID-5 groups provide for data striping with single parity and RAID-6 groups provide for data striping with double parity thereby providing a higher level of RAID group fault tolerance than RAID-5 groups. A storage pool may generally represent a pool or logical portion of physical storage that may include multiple RAID groups. A storage pool may be homogeneous such as including RAID groups of all the same type or technology of physical storage device (e.g., all SATA drives, all flash-based storage drive). A storage pool may alternatively be heterogeneous including multiple RAID groups of different types or technologies of physical storage. Such a storage pool may also be characterized as including multiple tiers or types of storage each tier having different performance characteristics. For example, a storage pool may include a first RAID group of SATA rotating disk drives, a second RAID group of FC rotating disk drives, and a third RAID group of flash-based storage drives. LUNs may be provisioned from a RAID group or a storage pool.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Management software may be used in connection with management of data storage systems. The management software, as well as more generally any software, may obtain inputs used in connection with performing an operation or task. The management software may be characterized as a client which issues requests to a server, such as a data storage system, in connection with performing requested operations. In one embodiment, the data storage system management software, as a client, may execute on a computer system which communicates with the data storage system that services data storage system management requests from the client. More generally, the data storage system management software may execute on any suitable processor including a processor of the data storage system as well as another system or component.

In an embodiment in accordance with techniques herein, management software, such as for management of a data storage system, provides for defining one or more policies for management based tasks. The policy may specify a criterion or conditions and associated threshold(s). The current state of the data storage system may be monitored to detect the occurrence of the criterion or conditions based on the associated threshold(s). Responsive to detecting the occurrence of the criterion or conditions meeting the associated threshold(s), the policy also specifies one or more actions that are taken.

It should be noted that techniques herein may be described in examples of embodiments with management of resources of a data storage system. However, those skilled in the art will appreciate that techniques herein for policy based system management may be more generally applied to any suitable resource of any suitable system or component.

Use of such policies in an embodiment in accordance with techniques herein provides a flexible mechanism for active management of the data storage system. Thus, as described in more detail in following paragraphs, an embodiment in accordance with techniques herein may use policies, for example, to assist the data storage administrator in managing the data storage system, support meeting and maintaining QOS (quality of service) goals of the system, support meeting and maintaining QOS (quality of service) goals that may be specified for customers or tenants of the data storage system such as in a multi-tenant environment, and the like. For example, a policy may be defined for an important tenant, such as a business running one or more applications having their data stored on a particular LUN of the data storage system. The policy may define a QOS goal such as an I/O performance goal (e.g., minimum I/O response time) for the tenant, and thus the particular LUN used by the tenant's applications. The policy may specify the QOS goal using a criterion that is response time as the metric, a threshold denoting a minimum I/O response time to be maintained, and one or more actions to be taken responsive to such QOS goal not being met. Management software may monitor I/O performance for I/Os directed to the LUN and detect when the measured I/O performance for I/Os directed to the LUN does not meet the specified QOS goal. Responsive to detecting such a condition of the policy criteria of the minimum I/O response time for the LUN not being met, an action also included in the policy may be automatically taken.

In one embodiment in accordance with techniques herein, data storage system management software may support policy based management tasks. For example, the system administrator may define various kinds of policies during the setup of the data storage system and save such policies to a database. The policies may be flexibly defined against any metrics data, such as based on timing (e.g., schedule an action to be performed at a particular time of day, at regular defined intervals), using key performance indicators or KPIs (e.g., schedule an action to be performed if a monitored metric denoting a KPI reaches a threshold specified in the policy), and/or based on system or storage resource events (e.g., when a particular event occurs on the data storage system or with respect to specified resource as specified in the policy criteria, take an action).

As will be described in more detail below, in one embodiment when the data storage system management software is executing, a policy based management engine may execute a separate working thread that periodically checks the policies based on timing and KPIs. The engine may also register indications on storage objects denoting storage resources specified in any event based policies. When criterion of a defined policy is met (e.g., the time point specified in criterion of a time-based policy is reached, a KPI exceeds a threshold specified in a KPI based policy, or an event occurs in the system or with respect to a storage resource and that event is specified in an event based policy), the defined one or more actions of the policy are taken. With this approach, techniques herein may be used to facilitate improve QOS and provide customized user experience to storage tenants and customers.

Figure 2:
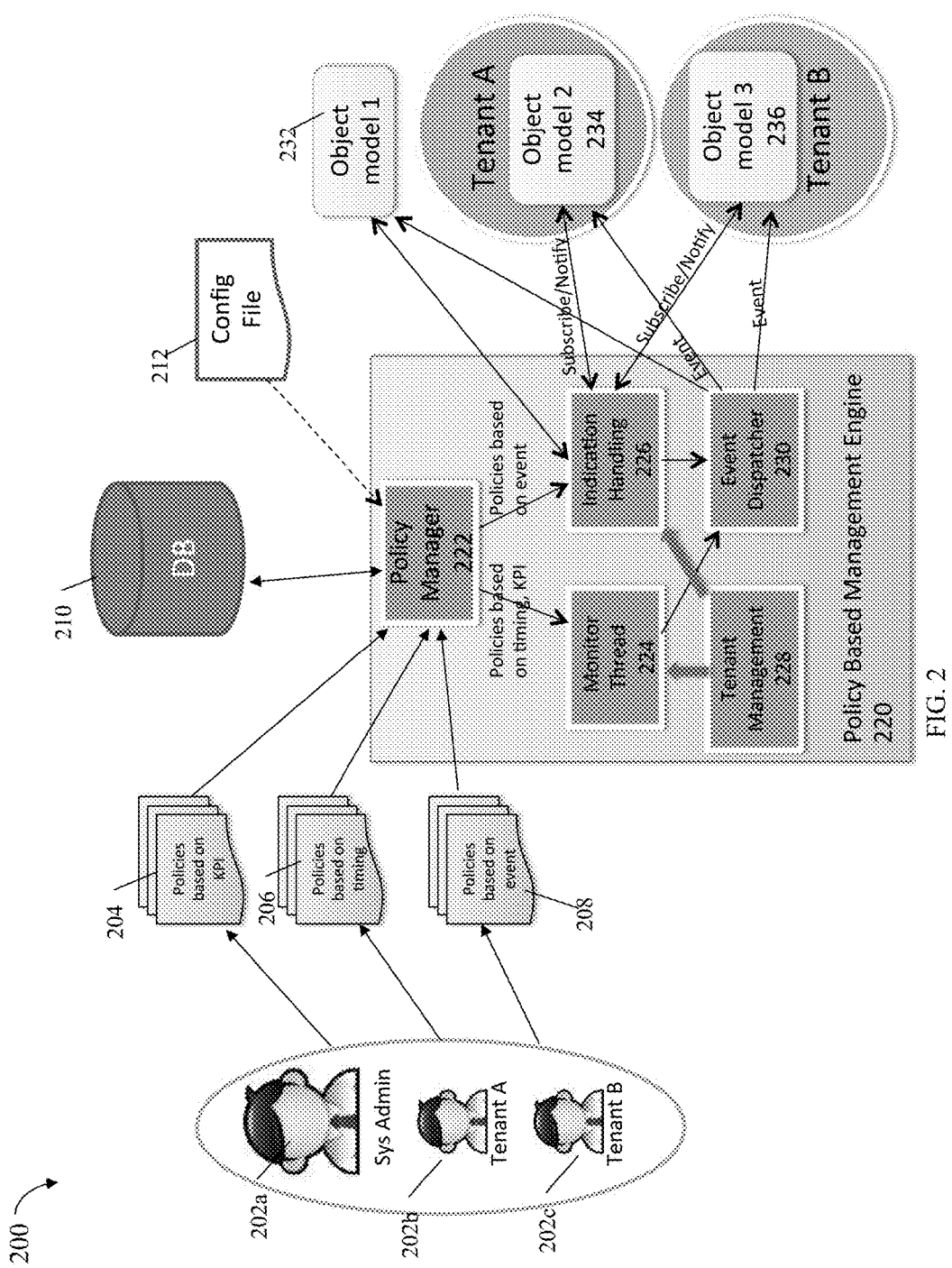
FIG. 2 is an example of components that may be included in an embodiment in accordance with techniques herein.

Referring to FIG. 2, shown is an example 200 of components and general workflow between such components in one embodiment in accordance with techniques herein. Element 202*a* may represent a data storage administrator or sysadmin that defined the system level policies. For example, system level policy may be specified that is not specific for any particular tenant but rather may relate generally to the system. For example, a system level policy may be defined in which the system administrator is notified regarding a failure of a component of the data storage system such as of a physical device failure or a power failure (e.g., primary or secondary power source failure). The system administrator 202*a* may also set up one or more tenant accounts and assign proper resources to the tenant. For example, in a multi-tenant environment, multiple tenants such as multiple companies or businesses, may use the resources of the same data storage system. The system administrator 202*a* may allocate various resources of the system for use by the different tenants. Element 202*b* and 202*c* may represent two different tenants of the data storage system. Each tenant 202*b*, 202*c* may perform management of its own allocated resources. For example, each tenant 202*b*, 202*c* may define its own policies regarding use of its allocated resources on the data storage system.

Elements 204, 206 and 208 may represent the different types of policies that can be defined by a tenant 202*b*, 202*c* and/or the system administrator 202*a*. Element 204 may represent the one or more defined policies (system or tenant specified) based on KPIs. Element 206 may represent the one or more defined policies (system or tenant specified) based on timing. Element 208 may represent the one or more defined event based policies (system or tenant specified).

Element 210 represents a database (DB) of all defined policies in the data storage system. The DB 210 may be queried by different modules of the policy based management engine 220, or more generally, modules of the data storage management software some of which are described below in more detail.

Element 220 is the policy based management engine and may be included in the data storage system management software described above and elsewhere herein. In one embodiment, element 220 may represent the set of collective modules 222, 224, 226, 228 and 230.

Element 212 is a configuration file specifying actions along with KPI, timing and events available in a system for use in configuring a policy. For example, the KPI, timing and events specified in the configuration file 212 may be presented in a list of criteria to a user, such as in a graphical user interface (GUI) for defining a policy where the user may select from those in the list when specifying one or more criteria for the policy. The configuration file may specify all or some portion of less than the total set of possible criteria that may be specified in a policy. Similarly, the configuration file may specify all or some portion of less than the total set of possible actions that may be specified in a policy.

Elements 232, 234 and 236 may each refer to an object model or instance logically representing a storage resource in the data storage system or even the data storage system itself For example, element 232 may be an object representing the data storage system, element 234 may be an object representing a first storage resource, such as a storage pool or RAID group, used by tenant A, and element 236 may represent a second storage resource, such as a single LUN, used by tenant B.

The policy manager module 222 may load the actions and also the KPI, timing and event types from configuration file 212 and accept policy definition and/or change requests from a user. The user may be a user of the management software, such as any of users 202*a-c* and such requests may be to define a new policy and/or change an existing policy. The policy manager 222 may store any new policy definitions or changes to existing defined policies to the DB 210. The policy manager 222 may also accept queries from other modules (e.g., such as 224 and 226) for the policies defined and persisted in the DB 210.

The monitoring thread module 224 may perform processing including periodically checking current values regarding the timing against those referenced or used in criteria of time-based policies and including periodically checking current values for KPIs of the configuration file against thresholds for those KPIs referenced or used in criteria of KPI-based policies. If current timing or current value for a KPI meets the criterion specified in a defined policy, the monitoring thread performs processing that triggers a corresponding action in the defined policy. As described in more detail below, for actions against an object, it will translate the action into event and send it to the event dispatcher module 230.

The indication handler module 226 subscribes to indications of objects specified in event-based policies. In this manner, if an event of interest (as referenced in criterion of a policy) occurs for an object, the indication handler 226 is notified. Once notified, the indication handler 226 may perform processing to extract the actions from the policy defined, create an event object or data structure including information such as for the particular action, and send the event object to the event dispatch module 230.

The event dispatch module 230 receives events such as in the form of event objects from other modules, such as 224 and 226. The event dispatch module 230 may then deliver the event to a specific object instance or object model (e.g., 232, 234 or 236) as may be specified in information included in the event object.

The tenant management module 228 provides tenant information to other modules such as 224 and 226. For example, as noted elsewhere herein, the indication handler 226 and monitoring thread 224 may each perform processing to translate an action into an event object. Part of such processing may include obtaining tenant information included in the event object. For example, as described elsewhere herein, an action may be to send an email notification to the data storage system administrator and/or a tenant. The one or more email addresses may be specified as parameters of the action.

In one embodiment in accordance with techniques herein, the event object (e.g., such as sent from 224 and 226 to the event dispatcher 230) may include the following:

Object model class denoting a class or type of storage resource for which this event object is being created. For example, storage pool, LUN and RAID group may each refer to a different object model class or storage resource type.

Object model instance id identifies the specific obtain instance. For example, if the object model class is storage pool, the object model instance id uniquely identifies the particular storage pool.

Action id identifies the particular action to be taken. Action id may be an identifier denoting one of a predefined set of possible actions.

Action parameters are the parameters for this particular action as specified by action id.

As described elsewhere herein, the object model class and object model instance id of the event object may be as included in one or more database tables of the DB 210 (e.g., table 470) and the action id and action parameters may be also included in one or more database tables of the DB 210 (e.g., table 450).

As noted above elements 232, 234 and 236 each represent a different object instance or object model. Each object instance or object model has its own state machine to track one or more aspects related to its associated status and any changes to such status. Each object instance of object model receives event objects (as described in more detail elsewhere herein). Additionally, the object model may further dispatch any necessary event notifications, for example, to a driver of the data path.

Each of the policies 204, 206 and 208 define monitoring criterion and one or more actions to be taken if a condition including the specified criterion and any associated threshold is reached. Policies may be defined using various interfaces of the management application. For example, in one embodiment, a policy may be defined through user interactions with any of a graphical user interface (GUI) and a command line interface (CLI). Resulting policy definitions may be stored in the DB 210. In one embodiment, a user may define a policy by specifying a criterion and associated information. For each criterion of a policy, the following may be specified:

1. The criterion to be monitored.
2. The threshold(s) of the criterion. Note that this may be more than one threshold, for example, if the particular criterion such as a monitored KPI is used with a range of values. It should also be noted that there may be no threshold for a policy.
3. The storage resource(s) being monitored. It should be noted that the storage resource may be a specific resource, such as a storage pool or LUN, or it may be no storage resource at all indicating the criteria is applied is global criteria generally applied to detecting a particular state or condition of the data storage system. For example, rather than have the policy apply to a particular tenant's storage pool or LUN, the policy may be applied across the system globally to all LUNs or all storage pools in the data storage system.
4. The action(s). The action field may have one or more values. If there are multiple values specified in the action field, it means that multiple actions may be triggered simultaneously. Based on the particular action specified, additional action parameters may also be specified when defining a policy. For example, when e-mail notification is selected, the action parameters may specify multiple target recipients to be notified where email addresses of such recipients may be configured as part of defining the policy. For some storage resource actions, the target specified as the action parameter may be storage resource itself. For example, a policy may be defined for a storage pool which includes criteria specifying that if more than 80% of the storage pool is consumed, an action should be taken to automatically expand the storage size or total capacity of the pool such as by adding a new RAID group to the storage pool. In this case, the action parameter may indicate to notify the storage resource or object representing the resource to perform the automatic action to expand the storage pool. Additionally, a second action may be specified to notify one or more email recipients that the automatic storage pool expansion is taking place. The email addresses for the recipients may be identified using one or more action parameters of the second action.

Figure 3A:
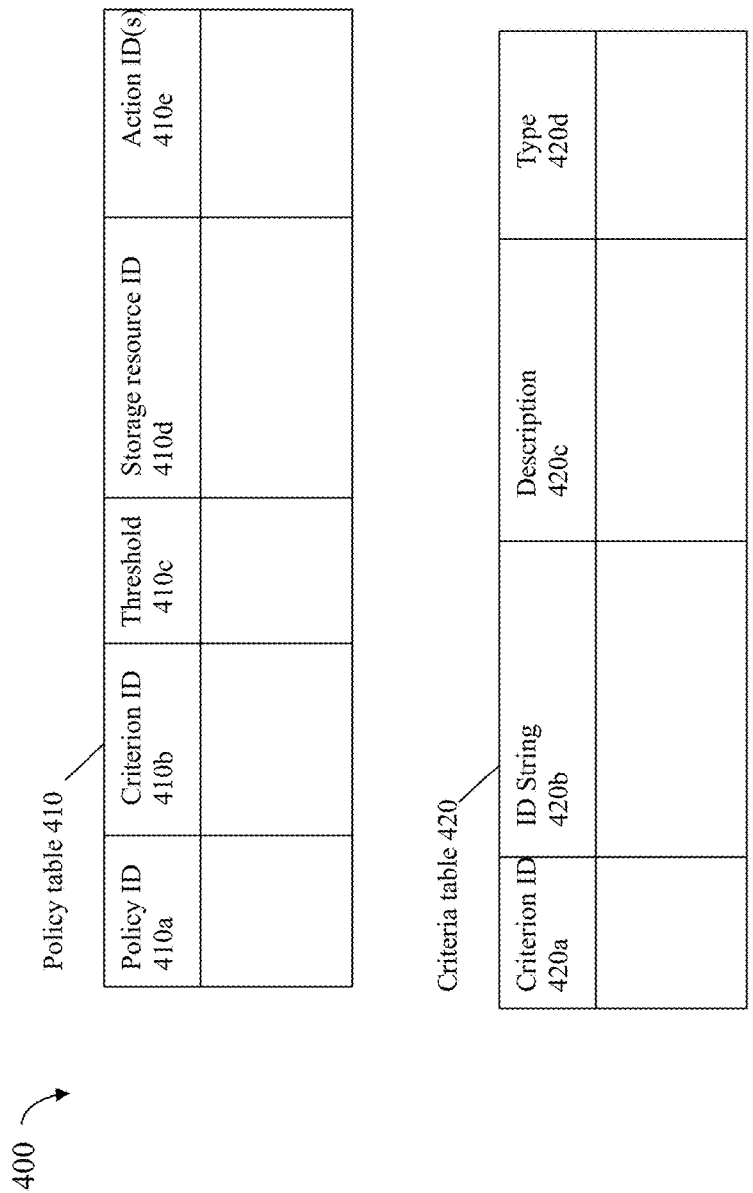
FIGS. 3A and 3B are examples of database tables that may be used in an embodiment in accordance with techniques herein.
Figure 3B:
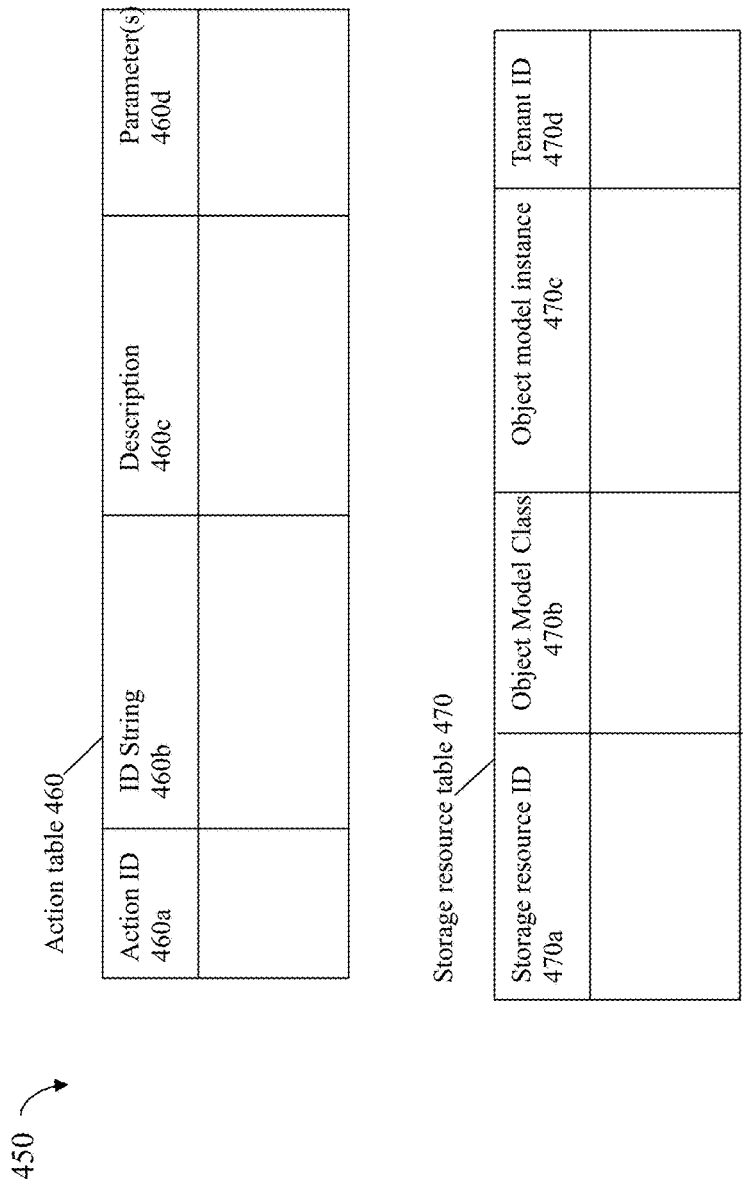

Referring to FIGS. 3A and 3B, shown are examples of some database tables that may be included in the DB 210 in an embodiment in accordance with techniques herein. The example 400 of FIG. 3A includes a policy table 410 and criteria table 420.

The policy table 410 may include the following columns: policy ID 410*a*, criterion ID 410*b*, threshold 410*c*, a storage resource ID 410*d* and one or more action IDs 410*e*. In one embodiment, a policy definition may include a row of values for each defined policy. The Policy ID 410*a* is a primary key used in the database to index into the table 410. Criterion ID 410*b* may be an index or id referring to a row of the criteria table 420 described below. Threshold 410*c* specifies a threshold, such as a value, used in connection with the criterion of 410*b*. Storage resource ID 410*d* may be an index or id referring to a row of the storage resource table 470 described below. As also described herein, storage resource ID may be global rather than specify a particular storage resource ID Action ID 410*e* may be an index or id referring to a row of the action table 460 described below. In one embodiment, a single cell or entry in column 410*e* may denote one or more action IDs each identifying a different action to taken. In such an embodiment, if there are multiple action IDs for a single criterion, such multiple action IDs may be specified, for example, as an array or list of action IDs.

Thus, for a row of table 410 denoting a defined policy, if a condition identified using the criterion ID 410*b* and threshold 410*c* of a row is met for the particular storage resource ID 410*d* of the row, the one or more actions identified in column 410*e* of that row are taken.

Since each row of table 410 defines a policy using various IDs in columns 410*b*, 410*d* and 410*e* that index into other database tables, a defined policy may specified as a "join" of these other database tables based on the specified IDs in columns 410*d*, 410*d* and 410*e* for a particular policy.

It should be noted that for a particular policy definition, storage resource or threshold may be not applicable. This is described in more detail with reference to particular examples of policies elsewhere herein.

The criteria table 420 may include the following columns: criterion ID 420*a*, ID string 420*b*, description 420*c* and type 420*d*. Each row of the table 420 includes information for a different criterion that may be specified in a policy. The criterion ID 420*a* is a primary key used in the database to index into the table 420. ID string 420*b* may be a string constant used to identify the particular criterion. Description 420*c* may be a description of the criterion and may be displayed, for example, in a user interface as an associated text description to a user defining a policy. The type 420*d* may identify the criterion type as one of three predefined types: KPI, event or time based. In one embodiment, keywords may be used to denote the three predefined types (e.g., "KPI", "event" and "schedule" may respectively denote the types of KPI, event and time-based). These keywords denoting the predefined types may be specified in the configuration file and selected by a user using the GUI or CLI when defining a policy.

The action table 460 may include the following columns: action ID 460*a*, ID string 460*b*, description 460*c* and parameter(s) 460*d*. Each row of table 460 includes information for a different action that may be specified in a policy. The action ID 460*a* is a primary key used in the database to index into table 460. ID string 460*b* may be a string constant used to identify the particular action. Description 460*c* may be a description of the action and may be displayed, for example, in a user interface as an associated text description to a user defining a policy. As mentioned elsewhere herein, the ID string 460*b* and parameters 460*d* for a triggered action may be included in the event object.

The storage resource table 470 may include the following columns: storage resource ID 470*a*, object model class 470*b*, object model instance 470*c* and tenant ID 470*d*. A row of table 470 includes information for a single resource referenced in a policy definition. The storage resource ID 470*a* is a primary key used in the database to index into table 470. Object model class 470*b* may identify the particular class or type of storage resource, such as a storage pool, LUN, and the like. Object model instance 470*c* may identify the particular object instance, such as an identifier of the particular LUN or storage pool (e.g., particular instance of the specified object model class). Tenant ID 470*d* may be an identifier denoting the particular tenant that owns the storage resource represented by the row of the table 470. As mentioned elsewhere herein, information of columns 470*b-d* may be included in the event object for a triggered action to be taken with respect to a storage resource of a defined policy.

Referring to FIG. 4, shown is an example of KPIs (type column 420*d*=KPI) that may be included in the criteria table 420 in an embodiment in accordance with techniques herein. Each row in 300 may have an associated unique criterion ID. The first two columns of 300 are labeled 420c and 420b denoting values specified in respectively labeled columns of the criteria table 420 of FIG. 3A. The third column usage 320 denotes a description of how the KPI may be used in a defined policy.

Element 302 denotes a KPI related to performance of I/Os per second or I/O rate per second with an ID string of IOPS that may be used in a policy for a particular tenant's storage resource (e.g., single LUN or single storage pool of a tenant). Column 320 of row 302 also indicates that the IOPS KPI may also be specified globally to apply to all instances of a particular object model class or type of storage resource. For example, a defined policy may indicate that the KPI of IOPs may be applied globally to all LUNs or all storage pools.

Element 304 denotes a KPI of an amount of time a specified storage resource is available (e.g., online or available for use). Column 320 of row 304 also indicates that the system available time may be specified to globally apply to all instances of a particular object model class or type of storage resource. For example, a defined policy may indicate that the KPI of IOPs may be applied globally to all LUNs or all storage pools.

Element 306 denotes a KPI related to a number of login failures for the same account or user id of the management application. Column 320 of row 306 indicates that the KPI LOGIN_FAILURE may be specified in a defined policy with multiple thresholds: a first threshold value denoting a number of login failures such as 30 and a second threshold value denoting a time period during which the number of login failures occurs for the same account. When specifying the KPI of row 306 in a policy, the storage resource ID may identify the user account or id.

Element 308 denotes a KPI of enclosure temperature of the data storage system. As known in the art, the enclosure may enclose the storage devices and it is important to avoid physical storage device and equipment failure that the temperature of the data storage system enclosure operate in a favorable defined range (e.g. not to exceed a maximum threshold temperature). When specifying ENCLOSURE_TEMPERATURE in a policy definition, a threshold may be defined denoting the maximum threshold temperature and the associated storage resource ID may be not applicable or global. If the real time temperature measure reaches the threshold temperature, the one or more actions of the policy are taken.

Element 310 denotes a KPI of power consumption of the data storage system that is a rolling average based on the last 30 minutes. When specifying POWER_CONSUMPTION in a policy definition, a threshold level of power consumption may be defined denoting a maximum threshold and the associated storage resource ID may be not applicable or global. If the measured power consumption reaches the threshold level of power consumption, one or more actions of the policy are taken.

Element 312 denotes a KPI of VM (virtual machine) provisioning speed denoting an amount of time it takes a tenant to provision storage on the storage system for use by a VM (such as may be executing on a host). As known in the art, different applications may execute on the host in a virtualized environment in the context of a VM. For example, an embodiment may have one or more virtual machines executing on a single physical machine, such as a single host, in a virtualized environment using virtualization software produced by VMware, Inc. In the context of each virtual machine, one or more applications may be executed, where the applications may include any one or more of, for example, an email application such as Microsoft Exchange, a web server, or a database application. Each VM may utilize its own set of data that is located on a LUN or storage pool of the data storage system. One management task may be to provision storage for use by a particular VM and the KPI of row 312 may identify an amount of time it takes the data storage system to complete a management request to provision storage for use by a virtual machine. When specifying VM_PROVISIONING_SPEED in a policy definition, a threshold amount of time (e.g., such as in seconds) may be specified denoting a maximum amount of time to complete a VM provisioning request. In a policy defined using the criterion of 312, the storage resource ID may identify a particular tenant's storage resource, such as a LUN used for storing data of the VM of the tenant. Alternatively, the storage resource ID may indicate that the policy referencing the KPI of 312 globally applies to all instances of a particular object model class or type of storage resource. For example, a defined policy may indicate that the KPI of VM_PROVISIONING_SPEED may be applied globally to all LUNs of all tenants.

Figure 5:
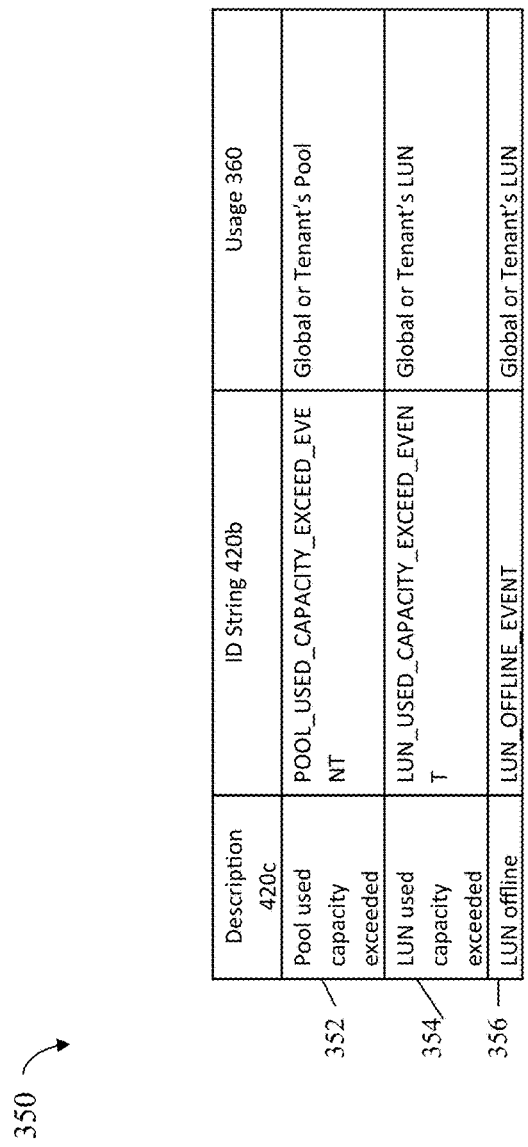
FIG. 5 is an example of events that may be included in an embodiment in accordance with techniques herein.

Referring to FIG. 5, shown is an example of events (type column 420d=event) that may be included in the criteria table 420 in an embodiment in accordance with techniques herein. Each row in 350 may have an associated unique criterion ID. The first two columns of 350 are labeled 420c and 420b denoting values specified in respectively labeled columns of the criteria table 420 of FIG. 3A. The third column usage 360 denotes a description of how the event may be used in a defined policy.

Element 352 denotes an event where a subscriber, such as the indication handler, is notified when a storage pool's used capacity exceeds a defined threshold specified in the policy definition. POOL_USED_CAPACITY_EXCEED_EVENT may be specified for a particular tenant's storage pool or may be globally applied to all storage pools in the system (e.g., for all tenants). Any policy specifying POOL_USED_CAPACITY_EXCEED_EVENT may include a threshold denoting a threshold percentage that, when exceeded, results in performing one or more actions of the policy.

Element 354 denotes an event where a subscriber, such as the indication handler, is notified when a LUN's used capacity exceeds a defined threshold specified in the policy definition. LUN_USED_CAPACITY_EXCEED_EVENT may be specified for a particular tenant's LUN or may be globally applied to all LUNs in the system (e.g., for all tenants). Any policy specifying LUN_USED_CAPACITY_EXCEED_EVENT may include a threshold denoting a threshold percentage that, when exceeded, results in performing one or more actions of the policy.

Element 356 denotes an event where a subscriber, such as the indication handler, is notified when a LUN goes to an offline state where the LUN is not available or accessible (e.g., data on the LUN cannot be accessed such as for read or write operations). LUN_OFFLINE_EVENT may be specified for a particular tenant's storage pool or may be globally applied to all storage pools. Any policy specifying LUN_OFFLINE_EVENT may indicate no threshold or threshold as not applicable.

Figure 6:
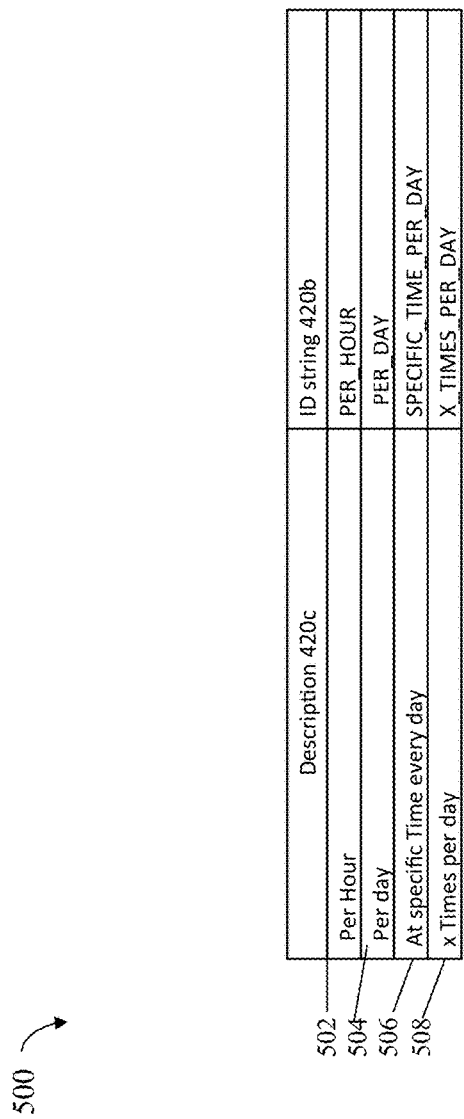
FIG. 6 is an example of different time based items that may be included in an embodiment in accordance with techniques herein.

Referring to FIG. 6, shown is an example of time-based criterion (type column 420d=schedule) that may be included in the criteria table 420 in an embodiment in accordance with techniques herein. Each row in 500 may have an associated unique criterion ID. The two columns of 500 are labeled 420c and 420b denoting values specified in respectively labeled columns of the criteria table 420 of FIG. 3A.

Element 502 denotes a criterion of PER_HOUR indicating that the specified policy defines a time-based policy with one or more associated actions to be performed every hour. It should be noted that a policy including this criterion may not have an associated threshold.

Element 504 denotes a criterion of PER_DAY indicating that the specified policy defines a time-based policy with one or more associated actions to be performed every day. It should be noted that a policy including this criterion may not have an associated threshold.

Element 506 denotes a criterion of SPECIFIC_TIME_PER_DAY indicating that the criterion identifies one or more particular actions to be performed occur at a specific time of the day associated with the criterion, such as every day at 5 pm. In a policy including SPECIFIC_TIME_PER_DAY, the particular time at which the one or more actions of the policy are taken may be denoted using the threshold of the policy. Alternatively, the particular time of day the action(s) of the policy are taken may be encoded or implied in a unique ID string for the particular criterion. For example, the ID string 420b may be "SPECIFIC_TIME_PER_DAY_YY" where "YY" may denote an hour of a 24 hour day (e.g., "01" for 1 a.m, "12" for noon, "13" for 1 p.m., and the like.

Element 508 denotes a criterion of X_TIMES_PER_DAY indicating that the criterion is included in a policy with one or more particular actions performed "X" times every day where X may generally denote a positive integer. An embodiment may further restrict X to be in a particular range or less than a maximum integer value. In one embodiment, a value for X may be specified as a threshold in the policy definition.

Referring to FIG. 7, shown is an example of actions that may be included in the action table 460 in an embodiment in accordance with techniques herein. Each row in 600 may have an associated unique action ID. The first two columns of 600 are labeled 460c and 460b denoting values specified in respectively labeled columns of the action table 460 of FIG. 3B. The third column usage 610 denotes a description of how the action may be used in a defined policy with respect to a storage resource or globally (e.g., applied system wide such as to all relevant storage resources for all tenants, to all tenants, and the like).

Element 602 defines a data collection action that may be performed globally such as with respect to all relevant storage resources of all tenants or for a particular tenant's storage resource. This may denote a general data log collection such as for a storage resource.

Element 604 defines an action to collect alert and health information that may be performed globally such as with respect to all relevant storage resources of all tenants or for a particular tenant's storage resource. This denotes a more specific type of data collection than 602 such as for a particular storage resource.

Element 606 defines an action of user interface (UI) notification resulting in a notification being displayed on a UI of the management application. This may be global in the UI notification may be sent to the UI for any/all users including the administrator and any/all tenants.

Element 608 defines an action of email notification resulting in a notification being sent to one or more specified recipient email addresses which may be parameters of the action. This may be global in that the email may be sent to any/all users including the administrator and any/all tenants.

Element 610 defines an action to automatically expand a storage pool when the pool's used capacity reaches a threshold level identified in the policy. This action may be applied to a single storage pool of a tenant or globally to all storage pools of all tenants.

Element 612 defines an action to automatically expand LUN when the LUN's used capacity reaches a threshold level identified in the policy. This action may be applied to a single LUN of a tenant or globally to all LUNs of all tenants.

Element 614 defines an action to automatically compress data of LUN. This action may be applied to a single LUN of a tenant or globally to all LUNs of all tenants.

Element 616 defines an action to automatically perform deduplication of data of a LUN. This action may be applied to a single LUN of a tenant or globally to all LUNs of all tenants. Data deduplication may refer to techniques for removing redundant or duplicate data portions of a LUN. For a single data portion that may appear multiple times/at multiple logical addresses in the same LUN, only a single physical copy of a data portion is stored and references to the single copy are used when referring to the multiple logical addresses of the LUN where the same data portion is stored.

Element 618 defines an action to automatically take a snapshot of a LUN. This action may be applied to a single LUN of a tenant or globally to all LUNs of all tenants. Snapshot may refer to a data facility that makes a point in time copy of a LUN. A snapshot is not a bit for bit physical copy but rather a logical point in time copy of the LUN.

Element 620 defines an action to automatically replicate a LUN. This action may be applied to a single LUN of a tenant or globally to all LUNs of all tenants. Replication generally may refer to making a complete bit for bit copy of the data that may be used, for example, should the original copy be destroyed or otherwise unavailable for use.

Element 622 defines an action taken as a security measure in response to detection of apparent malicious activity assumed to be an attempt to break into the system such as, for example, upon a high frequency or rate of failed login attempts to a user account. The action BAN IP ACTION may be, for example, to disable further logins for the user account for a specified time period or until re-enabled such as manually by an administrator.

Element 624 defines an action of data analysis and email notification which may provide for collected data, analyzing the collected data and sending an email notification to one or more recipients with the analysis results. The data collected may, for example, be related to the particular storage resource, KPI, and the like, specified in the policy including the action 624.

Based on the foregoing, following are some examples of policies that may be defined in a data storage system in an embodiment in accordance with techniques herein.

As a first example, a first policy may be defined that is a KPI based policy to detect when I/O performance as measured in IOPS for tenant A does not meet specified threshold. If so, a related data log may be collected and analyzed and the tenant notified. The first policy may include the following:

a. Criterion: IO Performance (IOPS) (e.g., 302 of FIG. 4)
 b. Actions: Data log collection (602 of FIG. 7), Email notification (default to the tenant, 608 of FIG. 7).
 c. Threshold: 80%, denoting that current IOPS for the tenant has decreased to below 80% of the average IOPS as measure in the last 24 Hrs.
 d. Storage Resource: LUN1 of tenant A.

A second policy may be defined that is a KPI based policy to detect when frequent login attempt failures happens on management port. In response, a warning will be sent to administrator and anti-attack actions can be automatically launched. The second policy may include:

a. Criterion: Login failure (e.g. 306 of FIG. 4)

b. Actions: Email notification (default to admin, 608 of FIG. 7), Anti-attack (Ban IP, 622 of FIG. 7)

c. Threshold: 30 login failures in 1 minute for the same login account.

d. Storage Resource: NA.

A third policy may be defined that is time based. At the end of every day, a daily report of system alerts and events can be sent to the administrator's email box. The third policy may include:

a. Criterion: 12:00 AM in every day (e.g., time-based criterion 504 of FIG. 6)

b. Actions: health and alert report notification to admin (e.g., 604 of FIG. 7).

c. Threshold: NA.

d. Storage Resource: LUN 1 of tenant A.

A fourth policy may be defined that is event based. When the storage pool's used capacity exceeds 80%, the pool will be automatically expanded per the policy defined. The fourth policy may include:

a. Criterion: Pool used capacity exceeds threshold (e.g., 352 of FIG. 5)

b. Actions: Pool auto expanding (e.g., 610 of FIG. 7)

c. Threshold: 80% of total capacity.

d. Storage Resource: Pool 1 of tenant A.

Figure 8:
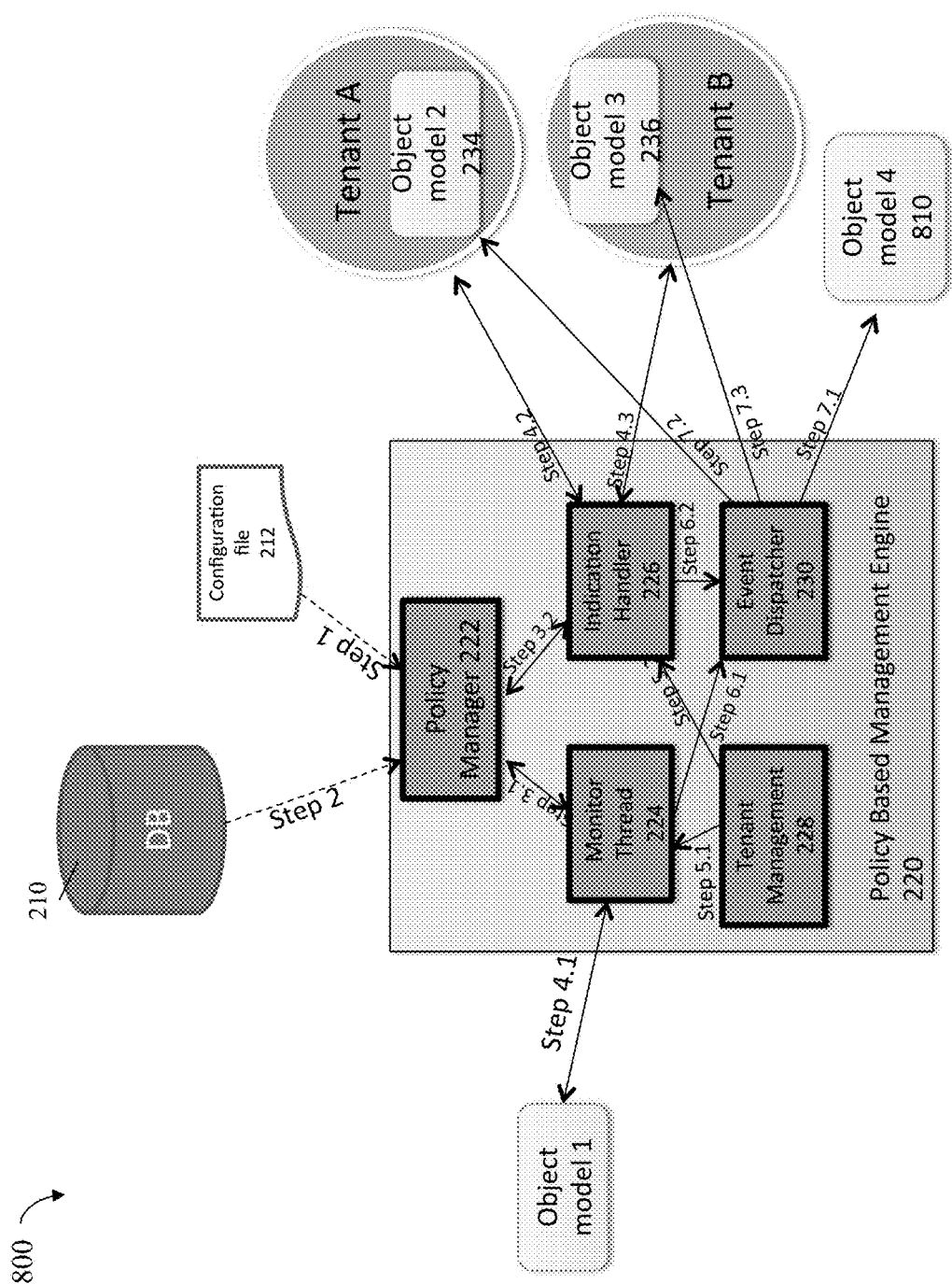
FIGS. 8 and 9 illustrate examples of various workflows that may be performed in an embodiment in accordance with techniques herein.

Referring to FIG. 8, shown is an illustration of a workflow using components in an example of an embodiment in accordance with techniques herein. The example 800 includes components similarly numbered and as described above, such as in connection with FIG. 2. The illustrated workflow in the example 800 may be performed as part of starting up the application, for example, as part of starting up the data storage system being managed.

In step 1, when the management software is starting up, the policy manager 220 may read in information from the configuration file 212 regarding the particular criteria (e.g., which of the KPI, timing, and events) and actions that may be used in defining policies. As mentioned elsewhere herein, the configuration file may be used to limit the particular criteria and actions that a user can specify when defining a policy. A total defined set of criteria and actions may represent all those supported by the application for use in a policy definition. However, a system administrator, third party providing the application, and the like, may further limit what criteria and actions may be specified in a policy definition by not including the total defined set of criteria and actions in the configuration file. In this manner, only those criteria and actions specified in the configuration file are available to defining a policy. For example, the policy manager 222 only presents to the user in the GUI those items specified in the configuration file 222.

In step 2, the policy manager 222 checks to see if there are any policies currently defined and persisted in the DB 210. If so, the policy manager 222 retrieves the defined policies from the DB 210 and stores them into an internal data structure in memory used by the policy manager 222.

In step 3.1, when the monitoring thread 224 is started, thread 224 queries the policy manager 222 to fetch all the policies based on KPI and timing criteria. The monitor thread 224 also subscribes to the policy manager 222 to be notified by the policy manager 222 of any new policies added or changed policies.

In step 3.2, when the indication handler 226 is started, the handler 226 queries the policy manager 222 to fetch all the policies based on events (e.g., storage resource events and/or system events). The indication handler 226 also subscribes to the policy manager 222 to be notified by the policy manager 222 of any new policies added or changed policies.

In step 4.1, the monitoring thread 224 periodically sends status query requests to all object models which have a KPI policy defined and subsequently receives responses from such object models. In this example, a currently defined policy is a KPI based policy based on the storage resource represented by object model 1.

In steps 4.2 and 4.3, the indication handler 226 subscribes to receive notification from object models which have an event type of policy defined. At a subsequent point in time, the indication handler 226 will receive notification regarding any event occurrences for such object models as indicated in the subscription. In this example, the handler 226 subscribes to object models 234 and 236 since there are currently defined event based policies with criteria identifying storage resources represented by object models 234 and 236.

In this example, step 5.1 is performed by the monitoring thread responsive to a condition including criterion of a KPI or timing based policy being reached and thereby triggering an action of the policy where the action requires obtaining tenant information. For example, the action may be sending an email notification to a tenant and in step 5.1, the monitoring thread obtains the email address of the tenant (e.g., generally tenant information) from the tenant management module 228. As described below, the tenant information may be included in an event object or data structure. It should be noted that the monitoring thread 224 may use the tenant ID 470*d* (e.g., FIG. 3B) associated with a particular storage resource of the policy including the triggered action to obtain the corresponding tenant information from the tenant management module 228.

Rather than perform step 5.1, step 5.2 may be performed by the indication handler 226 responsive to a condition including criterion of an event based policy occurring and thereby triggering an action of the policy where the action requires obtaining tenant information. For example, the action may be sending an email notification to a tenant and in step 5.2, the indication handler 226 obtains the email address of the tenant (e.g., generally tenant information) from the tenant management module 228. As described below, the tenant information may be included in an event object or data structure. It should be noted that the indication handler 226 may use the tenant ID 470*d* (e.g., FIG. 3B) associated with a particular storage resource of the policy including the triggered action to obtain the corresponding tenant information from the tenant management module 228.

In step 6.1, the monitoring thread 224 translates the action triggered by the KPI or timing based policy into an event. Such processing may include creating and populating an event object or data structure with information regarding the defined policy having the criterion that was met triggering transfer of control to the thread 224. For example, the event object may include the action id string 460*b* and any action parameters 460*d* of the defined policy and information identifying the storage resource type and instance (e.g., object model class 470*b* and object model instance 470*c*) to which the criterion applies. The event object or data structure may include, for example, the tenant information such as tenant email address. An example of an event object that may be used in an embodiment in accordance with techniques herein and populated in step 6.1 is described elsewhere herein. Step 6.2 may include processing similar to that as described for step 6.1 with the difference that step 6.2 is performed by the indication handler 226 rather than the monitoring thread 224.

In steps 7.1, 7.2 and 7.3, the event dispatcher 230 receives one or more event objects from other modules, such as the above-mentioned event objects from 224 and/or 226, and delivers the one or more event objects to specific object models representing the various storage resources of the defined policies including the triggered actions. The specific object models are also so identified in the event objects received by the dispatcher 230. As illustrated in FIG. 8, the event dispatcher 230 notifies or delivers the event object to an object model. In turn, the object model may then perform processing including carrying out any notification (e.g., email to a tenant) specified in the action identified in the received event object. Additionally, the object model represents a storage resource, such as a storage pool or LUN, identified in the event object and the object model may also perform further processing with respect to the storage resource for the particular action in the received event object. For example, the object model may expand the storage capacity of a storage pool or LUN represented by the object model if the action relates to perform such automatic expansion.

It should be noted that as a variation to the foregoing with respect to notifications specified by an action, an embodiment may have the event dispatcher directly send any email or other notifications specified for the particular action triggered.

Figure 9:
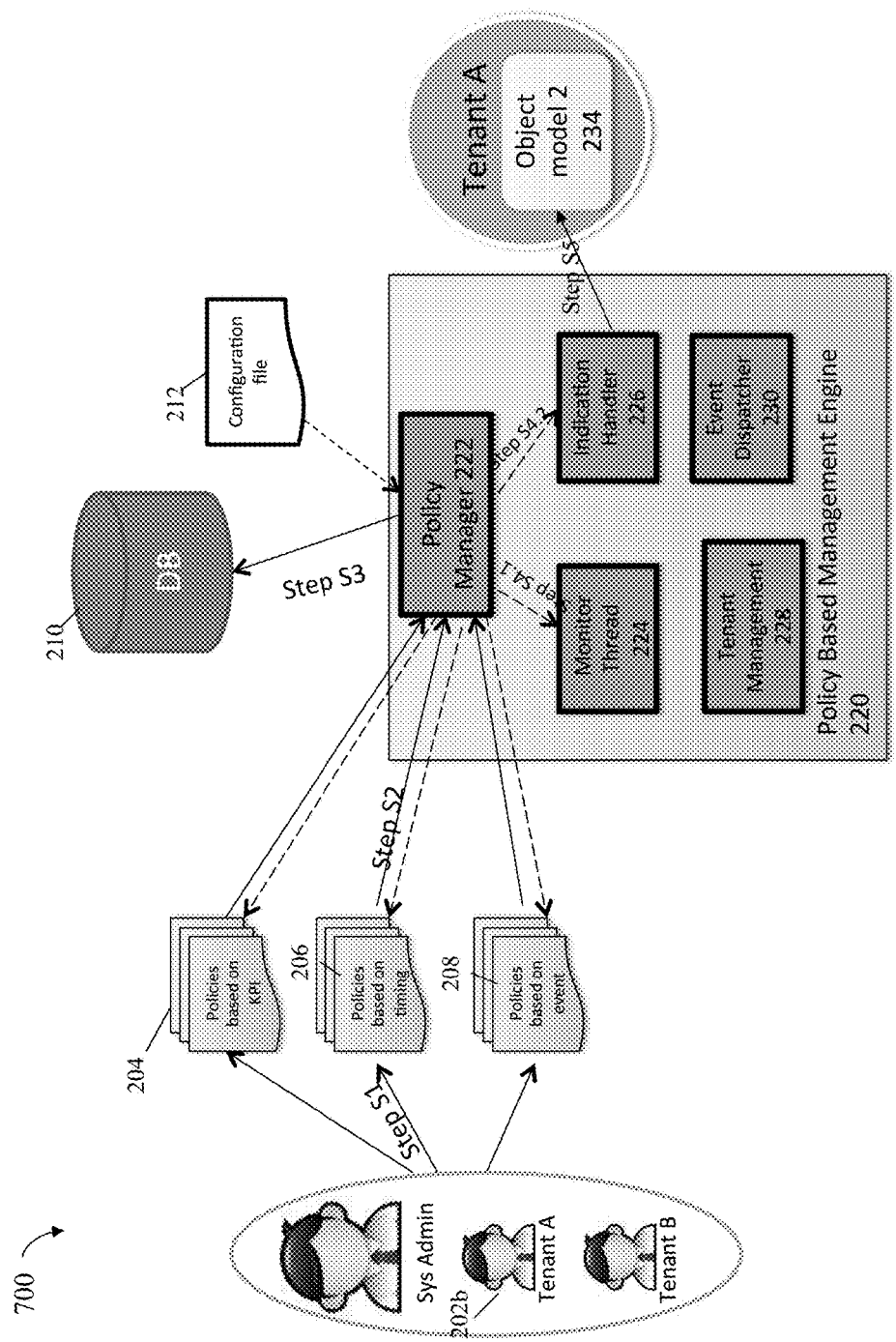

Referring to FIG. 9, shown is an illustration of a workflow to define a new policy using components in an example of an embodiment in accordance with techniques herein. The example 700 includes components similarly numbered and as described above, such as in connection with FIG. 2.

In step S1, a user, such as tenant A 202*b*, opens up the GUI of the application. In one embodiment, the GUI may display various menus and options from which the user may make selections to specify the criterion, threshold, action and storage resource for the new policy being defined. To display the foregoing selections in the GUI, the GUI may interact with the policy manager which may have such information stored in memory. As described elsewhere herein, the application has already read the configuration file 212 and stored such information read into memory prior to defining the new policy. As mentioned elsewhere herein, the configuration file may specify the possible options or candidates from which selection may be made for criteria and actions defined in the system. As an alternative to a GUI, the user may interact with the application generally using an suitable interface to define a policy that may vary with application. For example, a CLI may be used to define a policy. As part of step S1, the user makes various selections and/or inputs to specify the criterion, threshold, action and storage resource for the new policy. As also mentioned herein, the particular inputs may vary depending on the policy being defined. For example, the user may or may not specify a threshold if a threshold is not applicable for the particular policy being defined. Similarly, a user may provide parameters for an action selected such as, for example, one or more email addresses to be notified if the selected action is email notification.

In step S2, the user input and selections for the policy definition may be saved by the user, such as by making appropriate selection in the GUI. In response, the user inputs and selections may be transmitted to the policy manager 222. In step S3, the policy manager 222 saves the policy definition into the DB 210.

As described elsewhere herein, the new policy defined may be one of a set of predefined types. For example, in one embodiment as described herein, the set of predefined types may include KPI, event and timing based policy definition types. As part of the workflow when defining a policy, either step S4.1 or S4.2 is performed depending on the policy type.

Step S4.1 illustrates processing performed if the type of new policy defined is a KPI or timing-based policy. In step S4.1, when a new KPI or timing based policy is created, the policy manager 222 sends the "New" indication to the monitoring thread 224 to thereby notify the monitoring thread 224 of the new policy created. When the monitoring thread 224 receives the indication, the thread 224 may update an in-memory set of pools identifying the set of defined KPI and timing based policies. As described herein, the thread 224 periodically checks the current values for KPIs to those used in currently defined policies of the system. The thread 224 may use the set of pools as the set of policies currently defined in the system. Thus, by adding the new policy to this set of pools, at the next iteration, the monitor thread with also perform this checking and monitoring with respect to the new policy just added to the set of pools.

Step S4.2 illustrates processing performed if the type of new policy defined is an event based policy rather than a KPI or time based policy. When a new event based policy is created, in step S4.2, the policy manager 222 sends the "New" indication to indication handler 226. When the indication handler 226 receives the indication, the indication handler 226 subscribes (step S5) to the related object model for the new policy. In this example, assume the new policy being defined is an event based policy including criterion applied to object model 2 of tenant A where the criterion requires an action to be performed upon the occurrence of an event E1. In this case, the indication handler 226 subscribes to the object model 2 234 to receive notification if event E1 occurs with respect to the storage resource R1 represented by object model 234. As a result of the subscription, the indication handler 226 will be notified regarding any subsequent occurrence of E1 with respect to R1 as specified in the subscription.

Following is another example of a policy that may be defined and used in an embodiment in accordance with techniques herein. In one embodiment of techniques herein with management software of a data storage system, different service levels may be assigned to tenants based on a service contract with each tenant. For example, service levels may include "Gold", "Silver" and "Bronze" with Gold denoting the highest level of service, Silver denoting the second level of service and Bronze denoting the lowest or last ranked level of service. Based on the foregoing, the higher the service level, the more money a tenant may pay with the expectation that highest performance and service are obtained with the Gold level. Thus, generally, a tenant with a particular one of the 3 service levels should be provided with better service, higher IOPS and faster storage provisioning speed, etc than any lower ranked level of service.

In one example, a user of the management application may be a tenant storage administrator from a Gold level tenant (company FOO). The user may have just completed provisioning storage on the data storage system for100 VMs for its 100 new employees. The user, as the tenant administrator, feels that the amount of time it took to complete the foregoing storage provisioning for the 100 VMs was acceptable but slower than what he/she would have expected since they are a Gold level tenant. Meanwhile the system admin of the data storage system that is the service provider of the storage system (e.g., to whom company FOO pays the money for Gold level service) receives an email notification from the data storage system management software regarding the foregoing provisioning operation performed for the 100 VMS. The email notification may be sent as an action responsive to the occurrence of a KPI based criterion having a measured performance value that indicates a performance level below an expected threshold level. The email notification may indicate that the prior provisioning operation for provisioning storage for 100 VMs took longer than a specified threshold amount of time. The email notification may also include hints and may recommend some actions that can be taken to increase performance for the Gold level tenant when performing such VM provisioning requests. For example, the hints and/or recommended action may include a recommendation to pause one or more background data services when performing the VM provisioning requests for the Gold level tenant in an effort to make additional CPU cycles available for the provisioning. Such recommendations may include temporarily throttling down or reducing storage resources (e.g., CPU, system memory) used for servicing the tenant's own I/O and/or other tenants' I/O while provisioning storage for the VMs.

In such an example, the system may include the following policy definition:

a. Criterion: VM Provisioning speed (e.g. KPI 312 of FIG. 4), b. Action: Data analysis and email to System admin (e.g., action 624 of FIG. 7).

c. Threshold: more than 10 seconds per VM.

d. Storage Resource: Gold level tenant's LUN

Based on the foregoing policy definition, when the VM provisioning speed is degraded for gold level tenant to more than 10 seconds to provision storage for one VM, the action of data collection and analysis is triggered and an email report with data analysis result is sent to the system admin. The data collected and analyzed in this example may relate to the particular operation performed that is related to the KPI of VM provisioning speed specified in the policy definition.

Figure 10:
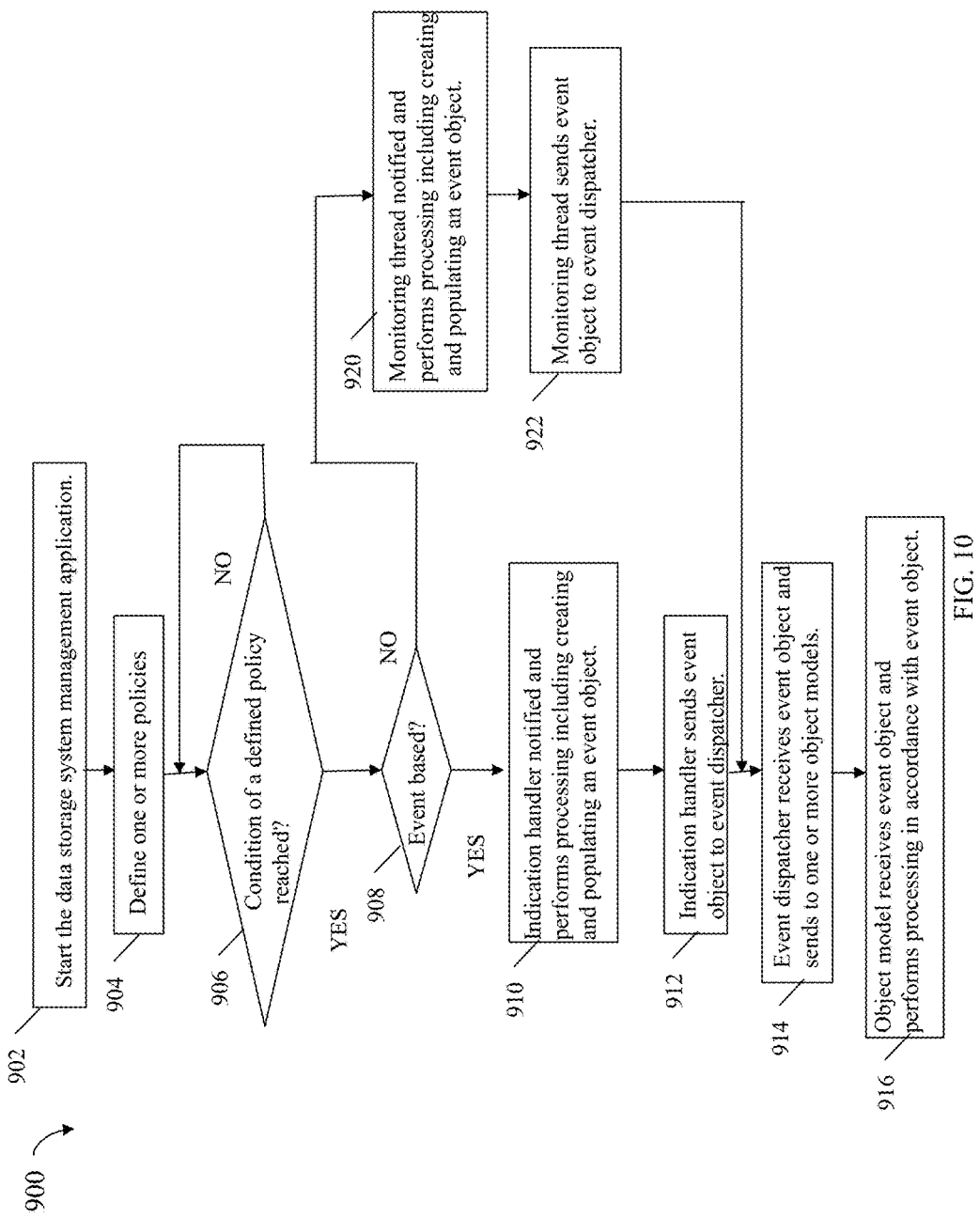
FIG. 10 is a flowchart of processing steps that may be performed in an embodiment in accordance with techniques herein.

Referring to FIG. 10, shown is a flowchart of processing steps that may be performed in an embodiment in accordance with techniques herein. The flowchart 900 summarizes processing steps described above that may be performed in an embodiment in accordance with techniques herein. At step 902, the data storage management application is started. It is assumed at step 902 that there are no currently defined policy. Step 902 may include perform processing such as described, for example, with reference to FIG. 8. In step 904, one or more policies may then be defined. Step 904 may include perform processing such as described, for example, with reference to FIG. 9. After performing step 904, the system may perform processing, for example, to service received I/O operations, perform data storage system management requests, and the like. At some time later, step 906 is performed where a determination is made as to whether a condition of a defined policy has been reached or met. The condition may be expressed using the criterion of the policy and any associated threshold that may be included in the policy. As described herein, some policies may not use a threshold specified in the policy (e.g., elements 502 and 504 of FIG. 6, and 356 of FIG. 5 (where a storage resource enters a particular state, such as LUN going offline, that does not have an associated threshold). In such a case, as with some time-based criterion, a threshold denoting an amount of time or periodic interval may be implicitly specified by the criterion. Step 906 may include, for example, criterion reaching a specified threshold of a policy that may be KPI-based, time-based criterion being met or reached, or event-based criterion occurring. At step 908 a determined is made as to whether the policy including the condition met or reached in step 906 is event based.

If step 908 evaluates to no, meaning that the policy is either KPI or time based, control proceeds to step 920 where the monitoring thread is notified. Such notification may be, for example, in response to a periodic query made by the monitoring thread regarding a current KPI value and determining the current KPI value meets, reaches or otherwise satisfies criterion and any threshold of a defined KPI based policy to subsequently trigger an associated action of the policy. Such notification may be, for example, a determination made by the monitoring thread that an amount of time has elapsed whereby time-based criterion of a defined time based policy is met, reached or otherwise satisfied (e.g. evaluates to true) to subsequently trigger an associated action of the policy. At step 920, the monitoring thread also creates and populates an event object. As described herein, the event object includes relevant information from the policy such as identifying a storage resource and one or more actions to be performed. Step 920 may also include, for example, obtaining any relevant tenant information from the tenant management module. If there are multiple actions in a single defined policy to be taken responsive to step 906 evaluating to yes, then all such multiple actions may be identified in the event object. At step 922, the event object is sent from the monitoring thread to the event dispatcher and control proceeds to step 914.

If step 906 evaluates to yes, control proceeds to step 910 where the indication handler is notified of the event occurrence. The indication handler performs processing similar to that performed by the monitoring thread in step 920 including creating and populating an event object. At step 912, the indication handler sends the event object to the event dispatcher and control proceeds to step 914.

At step 914, the event dispatcher receives the event object and sends the event object to one or more object models such as may be associated with one or more storage resources. Each of the one or more storage resources (having an object model to which the event object is sent) may be identified in the event object (e.g., also identified in the policy that includes the criterion satisfied or met in step 906). It should be noted that the event dispatcher may send the event object to multiple object models, for example, if processing is to be performed with respect to multiple storage resources for an action identified in the event object. For example, with reference back to FIG. 5, criterion of a policy may identify event 352 and the policy may indicate that the criterion is globally applied to all storage pools for all tenants. In this case, it may be that the notification to the indication handler identifies multiple storage pools each having the amount of used capacity exceed a specified threshold. For such an event, the event object may identify all such storage pools and the event dispatcher may send the event object to multiple object models each of which represents a different one of the storage pools exceeding the used capacity threshold.

At step 916, each of the object models from step 914 receives the event object and performs processing in accordance with the event object. Step 916 may include the object model perform processing with respect to an action of the event object for the storage resource represented by the object model. For example, such processing may include expanding storage capacity of a storage pool if the event object includes action 610 of FIG. 7 to automatically expand the storage pool capacity. Step 916 may include, for example, sending an email notification or a GUI notification if the event object identifies actions 608 or 606, respectively.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing system management comprising:
   receiving a plurality of policy definitions for a plurality of policies, wherein each of the plurality of policy definitions defines one of a set of predefined policy types including an event-based policy with event-based criterion, a time based policy with time based criterion and a key performance indicator based policy with key performance indicator criterion, the plurality of policy definitions including a first policy definition of a first policy, said first policy definition including information identifying a first criterion that is an event-based criterion, a plurality of resources of the system including a first resource of the system, and a first action to be taken, wherein the plurality of resources are a plurality of storage resources used to store tenant data and the first action includes automatically expanding storage capacity of the plurality of storage resources;
   configuring an indication handler that subscribes to receive notifications of event-based criteria including occurrences of the first criterion wherein the indication handler is notified regarding occurrences of event-based criteria for a first portion of the plurality of policies each being an event-based policy type;
   configuring a monitoring thread that performs processing for a second portion of the plurality of policies that include time based and key performance indicator based policy types, wherein the monitoring thread periodically queries object models associated with the second portion of policies for information used in determining whether at least one condition of a policy of the second portion of policies is met;
   determining whether a condition of the first policy is met, said condition including the first criterion;
   responsive to determining that the condition is met, performing first processing, said first processing including:
      notifying the indication handler regarding an event occurrence based on the condition met for the plurality of storage resources;
      creating, by the indication handler, an event object including information identifying the plurality of storage resources and identifying the first action to be taken by a plurality of object models where each of the plurality of object models represents a different one of the plurality of storage resources, wherein the first action includes automatically expanding storage capacity of the plurality of storage resources;
      sending, by the indication handler, the event object to an event dispatcher;
      sending, by the event dispatcher, the event object to the plurality of object models representing the plurality of storage resources; and
      responsive to each of the plurality of object models receiving the event object from the event dispatcher, performing the first action by said each object model wherein performing the first action includes said each object model automatically expanding storage capacity of one of the plurality of storage resources represented by said each object model;
   determining whether at least one condition of a policy of the second portion is met; and
   responsive to determining at least one condition of a policy of the second portion is met, performing second processing including the monitoring thread sending another event object regarding the at least one condition to the event dispatcher.

2. The method of claim 1, further comprising: receiving a configuration file including first information identifying a first portion of criteria and actions that may be specified in a policy definition; displaying, in accordance with the first portion of criteria and actions, multiple items on a user interface for configuring the first policy; and defining said first policy, wherein said defining includes selecting one or more of the multiple items from the user interface.

3. The method of claim 2, wherein the one or more items selected are included in the first policy definition and the one or more items specify any of the first criterion and the first action.

4. The method of claim 1, wherein the system is a data storage system.

5. The method of claim 1, wherein the first policy includes a threshold, and wherein said condition is met indicating the event occurrence when said first threshold is exceeded with respect to said first resource.

6. The method of claim 5, wherein the first resource is a first of the plurality of storage resources, wherein the first criterion denotes a threshold amount of total storage capacity of the first storage resource being consumed, wherein said first storage resource is any of a logical device and a storage pool.

7. The method of claim 6, wherein the first action including automatically expanding the total storage capacity of the first storage resource.

8. The method of claim 1, wherein the first action includes automatically performing any of sending any of an electronic mail notification to a user of a management application and displaying a notification on a user interface display.

9. The method of claim 1, wherein the first policy definition is specified using any of a graphical user interface and a command line interface.

10. The method of claim 2, wherein the first portion of criteria and actions identifies less than a total set of criteria and actions supported by a management application in connection with defining policies for system management.

11. A system comprising:
    a processor; and
    a memory, said memory including code stored therein that, when executed, performs a method comprising:
       receiving a plurality of policy definitions for a plurality of policies, wherein each of the plurality of policy definitions defines one of a set of predefined policy types including an event-based policy with event-based criterion, a time based policy with time based criterion and a key performance indicator based policy with key performance indicator criterion, the plurality of policy definitions including a first policy definition of a first policy, said first policy definition including information identifying a first criterion that is an event-based criterion, a plurality of resources of the system including a first resource of the system, and a first action to be taken, wherein the plurality of resources are a plurality of storage resources used to store tenant data and the first action includes automatically expanding storage capacity of the plurality of storage resources;

configuring an indication handler that subscribes to receive notifications of event-based criteria including occurrences of the first criterion wherein the indication handler is notified regarding occurrences of event-based criteria for a first portion of the plurality of policies each being an event-based policy type;

configuring a monitoring thread that performs processing for a second portion of the plurality of policies that include time based and key performance indicator based policy types, wherein the monitoring thread periodically queries object models associated with the second portion of policies for information used in determining whether at least one condition of a policy of the second portion of policies is met;

determining whether a condition of the first policy is met, said condition including the first criterion;

responsive to determining that the condition is met, performing first processing, said first processing including:

notifying the indication handler regarding an event occurrence based on the condition met for the plurality of storage resources;

creating, by the indication handler, an event object including information identifying the plurality of storage resources and identifying the first action to be taken by a plurality of object models where each of the plurality of object models represents a different one of the plurality of storage resources, wherein the first action includes automatically expanding storage capacity of the plurality of storage resources;

sending, by the indication handler, the event object to an event dispatcher;

sending, by the event dispatcher, the event object to the plurality of object models representing the plurality of storage resources; and responsive to each of the plurality of object models receiving the event object from the event dispatcher, performing the first action by said each object model wherein performing the first action includes said each object model automatically expanding storage capacity of one of the plurality of storage resources represented by said each object model;

determining whether at least one condition of a policy of the second portion is met; and responsive to determining at least one condition of a policy of the second portion is met, performing second processing including the monitoring thread sending another event object regarding the at least one condition to the event dispatcher.

12. A non-transitory computer readable medium comprising code stored thereon that, when executed, performs a method of system management comprising:

receiving a plurality of policy definitions for a plurality of policies, wherein each of the plurality of policy definitions defines one of a set of predefined policy types including an event-based policy with event-based criterion, a time based policy with time based criterion and a key performance indicator based policy with key performance indicator criterion, the plurality of policy definitions including a first policy definition of a first policy, said first policy definition including information identifying a first criterion that is an event-based criterion, a plurality of resources of the system including a first resource of the system, and a first action to be taken, wherein the plurality of resources are a plurality of storage resources used to store tenant data and the first action includes automatically expanding storage capacity of the plurality of storage resources;

configuring an indication handler that subscribes to receive notifications of event-based criteria including occurrences of the first criterion wherein the indication handler is notified regarding occurrences of event-based criteria for a first portion of the plurality of policies each being an event-based policy type;

configuring a monitoring thread that performs processing for a second portion of the plurality of policies that include time based and key performance indicator based policy types, wherein the monitoring thread periodically queries object models associated with the second portion of policies for information used in determining whether at least one condition of a policy of the second portion of policies is met;

determining whether a condition of the first policy is met, said condition including the first criterion;

responsive to determining that the condition is met, performing first processing, said first processing including:

notifying the indication handler regarding an event occurrence based on the condition met for the plurality of storage resources;

creating, by the indication handler, an event object including information identifying the plurality of storage resources and identifying the first action to be taken by a plurality of object models where each of the plurality of object models represents a different one of the plurality of storage resources, wherein the first action includes automatically expanding storage capacity of the plurality of storage resources;

sending, by the indication handler, the event object to an event dispatcher;

sending, by the event dispatcher, the event object to the plurality of object models representing the plurality of storage resources; and responsive to each of the plurality of object models receiving the event object from the event dispatcher, performing the first action by said each object model wherein performing the first action includes said each object model automatically expanding storage capacity of one of the plurality of storage resources represented by said each object model;

determining whether at least one condition of a policy of the second portion is met; and responsive to determining at least one condition of a policy of the second portion is met, performing second processing including the monitoring thread sending another event object regarding the at least one condition to the event dispatcher.

13. The non-transitory computer readable medium of claim 12, wherein the method further comprises:

receiving a configuration file including first information identifying a first portion of criteria and actions that may be specified in a policy definition;

displaying, in accordance with the first portion of criteria and actions, multiple items on a user interface for configuring the first policy; and defining said first policy, wherein said defining includes selecting one or more of the multiple items from the user interface.

14. The method of claim 1, wherein the plurality of policy definitions includes a second policy definition for a second policy, said second policy definition including information identifying a second criterion, a second resource of the system, and a second action to be taken.

15. The method of claim 14, wherein the second criterion includes any of a key performance indicator, a time based criterion and an event based criterion.

16. The method of claim 15, wherein the second criterion identifies a key performance indicator and the second policy definition includes a threshold, and wherein said condition is met when said key performance indicator is above said threshold.

17. The method of claim 14, wherein the first policy definition is stored in a database including a plurality of tables.

18. The method of claim 17, wherein the plurality of tables includes a criteria table, an action table, a storage resource table, and a policy table, said policy table including a row for each policy definition, said row including a criterion identifier identifying a row in the criteria table denoting a criterion of said each policy definition, a storage resource identifier identifying a row in the storage resource table denoting a resource of said each policy, and an action identifier identifying a row in the action table for an action of said each policy, and wherein said first policy definition has a corresponding row in said policy table.

19. The method of claim 16, wherein the key performance indicator is any of an I/O rate per unit of time, an amount of time a storage resource is available, a number of login failures per unit of time, a temperature, an average amount of power consumed, an amount of time to perform an operation, and an amount of time to provision storage for a virtual machine.

20. The method of claim 15, wherein the second action includes any of perform data collection, perform data analysis, send one or more electronic notifications, automatically perform any of compression, deduplication, snapshot, and replication, and automatically disable logins for a user account.

* * * * *